US007003307B1

(12) United States Patent
Kupsh et al.

(10) Patent No.: US 7,003,307 B1
(45) Date of Patent: Feb. 21, 2006

(54) SYSTEM AND METHOD FOR A MESSAGING GATEWAY

(75) Inventors: Jerry Kupsh, Concord, CA (US); Xuming Chen, Walnut Creek, CA (US)

(73) Assignee: Cellco Partnership, Bedminster, NJ (US)

( * ) Notice: Subject to any disclaimer, the term of this patent is extended or adjusted under 35 U.S.C. 154(b) by 188 days.

(21) Appl. No.: 10/354,885

(22) Filed: Jan. 30, 2003

Related U.S. Application Data (60) Provisional application No. 60/353,824, filed on Jan. 31, 2002.

(51) Int. Cl.
*H04Q 7/20* (2006.01)
(52) U.S. Cl. .................................. 455/466; 370/395.31
(58) Field of Classification Search ................ 455/466, 455/403, 412, 414.1, 418, 424, 445, 454; 370/355–360, 395.31, 395.1
See application file for complete search history.

(56) References Cited

U.S. PATENT DOCUMENTS

| 5,966,663 | A  | * | 10/1999 | Gleason ....................... 455/466 |
| 6,263,212 | B1 | * | 7/2001  | Ross et al. ................... 455/466 |
| 6,519,468 | B1 | * | 2/2003  | Donovan et al. ............ 455/466 |
| 6,718,178 | B1 | * | 4/2004  | Sladek et al. ................ 455/466 |
| 6,738,636 | B1 | * | 5/2004  | Lielbriedis ................... 455/466 |
| 6,819,932 | B1 | * | 11/2004 | Allison et al. .............. 455/466 |
| 6,856,809 | B1 | * | 2/2005  | Fostick ........................ 455/466 |
| 2001/0006897 | A1 | * | 7/2001 | Kang et al. .................. 455/466 |
| 2002/0119793 | A1 | * | 8/2002 | Hronek et al. .............. 455/466 |
| 2003/0199282 | A1 | * | 10/2003 | Marcjan et al. ............. 455/466 |

FOREIGN PATENT DOCUMENTS

WO       WO 2060190 A2 *   8/2002

OTHER PUBLICATIONS

SMPP Developers Forum, Short Message Peer to Peer Protocol Specification v3.4, Oct. 12, 1999 Issue 1.2 pp. 1-169.
SMS Forum, Short Message Peer to Peer Protocol Specification v5.0 Draft 06, Dec. 11, 2001, pp. 1-127.

* cited by examiner

*Primary Examiner*—CongVan Tran
(74) *Attorney, Agent, or Firm*—Darby & Darby (57) ABSTRACT

A system and method for routing a mobile message is presented. The method and system receive the mobile message at a mobile messaging gateway; and determine, at the mobile messaging gateway, the intended destination of the mobile message. The intended destination of the mobile message is one of an external messaging entity (ESME) and a Short Message Service Center (SMSC).

28 Claims, 4 Drawing Sheets

INBOUND ROUTING

| "Source-Address" | To |
|---|---|
| 925-239-XXXX | SMSC 222 |
| 212-653-XXXX | SMSC 222 |
| 935-362-XXXX | SMSC 222 |
| 213-389-XXXX | SMSC 220 |
| | |

OUTBOUND ROUTING

| "Destination-Address" | To |
|---|---|
| 888A | ESME 212 |
| 203-382-XXXX | ESME 214 |
| 975-942-XXXX | ESME 214 |
| 3926B | ESME 210 |
| | |

| SMSC | ESME |
|---|---|
| SMSC 218 | ESME 204 |
| SMSC 218 | ESME 206 |
| SMSC 218 | ESME 208 |
| SMSC 220 | ESME 210 |
| ⋮ | ⋮ |

FIG. 4

SYSTEM AND METHOD FOR A MESSAGING GATEWAY

This application claims the priority of U.S. Provisional Application No. 60/353,824 filed on Jan. 31, 2002 which is hereby incorporated hereby by reference in its entirety.

FIELD OF INVENTION

The present invention relates generally to wireless short messaging services and, more particularly, to a system and method for providing a single point of access from a plurality of non-mobile external short message entities to one or more short message centers.

BACKGROUND

The Short Message Peer to Peer (SMPP) protocol is a known protocol designed and utilized to facilitate communications of short messages between a short message center, such as a Short Message Service Center (SMSC) and an application platform external to the SMS network, such as a WAP proxy server, email gateway or other non-mobile messaging gateway. Such external application systems are known as External Short Messaging Entities (ESMEs). SMPP enables an ESME outside the mobile network to interface with an SMSC and thereby communicate with SMS-capable mobile devices.

SMPP v3.4, which is designed to be compatible with future versions of the specification, presently defines the SMPP protocol. SMPP v3.4 is available through the Internet at www.smsforum.net.

As fully explained therein, SMPP supports many wireless network technologies such as GSM, IS-95 (CDMA), ANSI-136 (TDMA) and iDEN.

SMPP is a packet-based protocol. More particularly, ESMEs and SMSCs that use SMPP communicate through packets known as protocol data units ("PDUs"). PDUs are utilized to define the session state of communications between an ESME and SMSC (e.g., whether an "open" communication channel exists between the devices). Additionally, PDUs transport requests relating to messaging between the devices. For example, certain predefined requests are utilized to send short messages to and from an ESME, replace or cancel short messages and query the status of the short message in the SMS network.

The application layer of the SMPP protocol may be either a TCP/IP or X.25 network connection. Thus, the SMPP protocol resides on either a TCP/IP or X.25 network connection between an SMSC and an ESME.

The SMPP protocol is utilized to implement third party value-added applications such as voice mail alerts; paging services; information services, e.g., information from a world wide web site that is displayed as a short message on the handset; vehicle management and location services; house-hold metering applications; and WAP-based information services. Third party providers of value added SMS services require an interface with the SMSC in order to send and receive the necessary information via SMS. The physical interface between an ESME and an SMSC may include a direct or hub connection (via X.25 or TCP/IP) to the SMPP.

Figure 1:
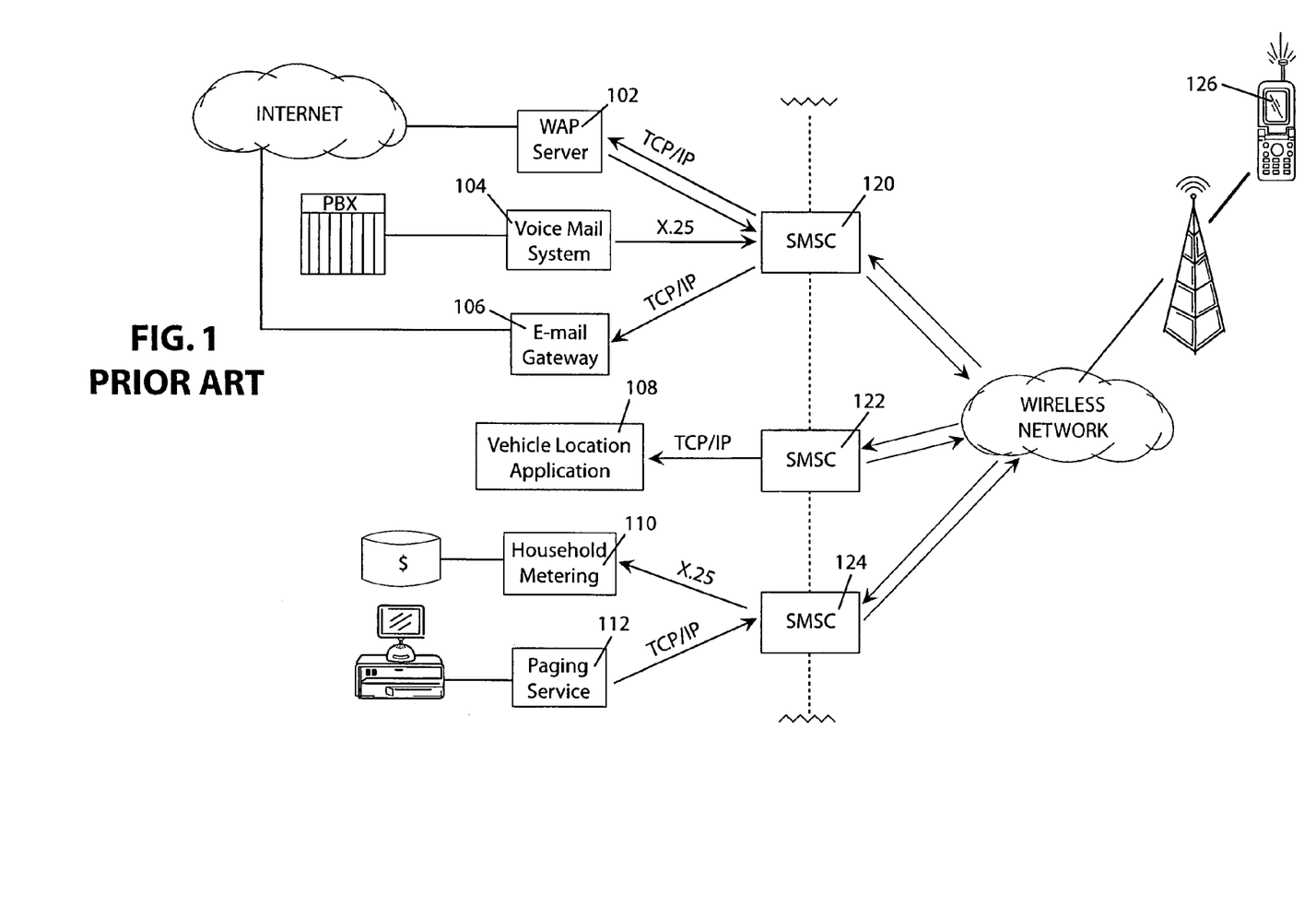
FIG. 1 is a block diagram illustrating a prior art system of interconnected ESMEs and SMSCs in accordance with the SMPP protocol.

FIG. 1 illustrates known SMPP connections between a plurality of ESMEs (102, 104, 106, 108, 110 and 112) and multiple SMSCs (120, 122 and 124). ESME WAP server 102, ESME voice mail system (VMS) 104 and ESME email gateway 106 are each directly connected to SMSC 120. In the example of FIG. 1, the secure connection between the ESMEs and SMSC 120 are provided by TCP/IP (for ESME WAP server 102 and ESME email gateway 106) and X.25 (for ESME voice mail system 104). As further illustrated in FIG. 1 the arrows between the respective devices logically illustrate the general flow of information. Thus, the arrow traveling from ESME voice mail system 104 to SMSC 120 indicates a one way flow of messages from the voice mail system to the SMSC for purposes of notifying SMS user 126 that a voice mail is pending and awaiting retrieval. The illustration of two arrows traveling in opposite directions between ESME WAP server 102 and SMSC 120 indicates two way information flow whereby SMS user 126 can send and receive information to and from the Internet utilizing SMS.

FIG. 1 further illustrates additional ESME devices (ESME vehicle location application 108, ESME household metering application 110 and paging service 112) that are similarly connected to additional SMSCs (122 and 124) of the wireless network.

In each connection illustrated in FIG. 1, a direct connection between the various ESMEs and an SMSC is required. The ESMEs are typically owned and operated by third party vendors who are not affiliated with the wireless carrier, i.e., the ESME operator is not under the operational control of the owner and operator of the SMSCs.

It has come to be realized that there are many disadvantages associated with allowing third party direct connections to an SMSC. For example, while SMPP provides for simple password authentication to allow an SMSC to authenticate attempted communication by an ESME, once authentication is verified, the entire SMS network may be accessible to the third party vendor. This may present security problems in the absence of additional security provisions.

Additionally, multiple ESMEs must often compete for the resources of a single SMSC to which they are all connected. As a result, the SMSCs are often forced to drop their connection with the ESME, route the communication to other available SMSCs, or place the communication in a queue until the SMSC is again available. All of these steps drain the resources of the SMSC and degrade its performance.

Additionally, the SMSCs are required to perform billing tasks and maintain billing data so that the third party vendors can later be charged for their use of the SMS networks. This functionally detracts the SMSC from its main purpose, namely, receiving, routing and sending SMS messages to and from their intended destination. Thus, overall system performance is degraded.

Accordingly, what is desired is a system and method for the centralization of communications between multiple ESMEs and one or more SMSCs to thereby provide a single point of access for the multiple ESMEs and to off-load tasks currently performed by the respective SMSCs to the single point of access.

SUMMARY

An embodiment of the present invention includes a mobile messaging gateway for routing mobile messages. The mobile messaging gateway includes: (1) a first port for receiving from an External Short Messaging Entity (ESME), a mobile message destined for a Short Message Service Center (SMSC); (2) a second port for sending to an ESME, a mobile message sent from an SMSC; (3) a third port for receiving from an SMSC, a mobile message destined for an ESME; (4) a fourth port for sending to an SMSC, a mobile message sent from an ESME; and (5) a micro-processor for controlling operation of the mobile messaging gateway. The operation of the mobile messaging gateway includes routing mobile messages from the ESME to the SMSC based on the identity of the ESME and from the SMSC to the ESME based on one of the identity of the destination of the mobile message and the identity of the SMSC.

Another embodiment of the present invention includes a method for routing a mobile message. The method includes the steps of: (1) receiving the mobile message at a mobile messaging gateway; and (3) determining, at the mobile messaging gateway, the intended destination of the mobile message. The intended destination of the mobile message is one of an external messaging entity (ESME) and a Short Message Service Center (SMSC).

Another embodiment of the present invention includes a method for controlling the flow of mobile message traffic between a mobile messaging center of a wireless network and a mobile messaging routing device located external to the wireless network. The method includes the steps of: (1) receiving packetized data at a mobile messaging gateway, the packetized data including information to facilitate delivery of a mobile message, where the mobile messaging gateway being disposed between the mobile messaging center and the external mobile messaging routing device; (2) determining the intended destination of the mobile message based on information contained in the data received at the mobile messaging gateway; (3) sending the mobile message to its intended destination; (4) recording the utilization of the mobile messaging gateway to send the mobile message to its intended destination; and (5) determining the ability to send additional mobile messages to the intended destination by referencing the recorded utilization of the mobile messaging gateway.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF AN EMBODIMENT OF THE INVENTION

Figure 2:
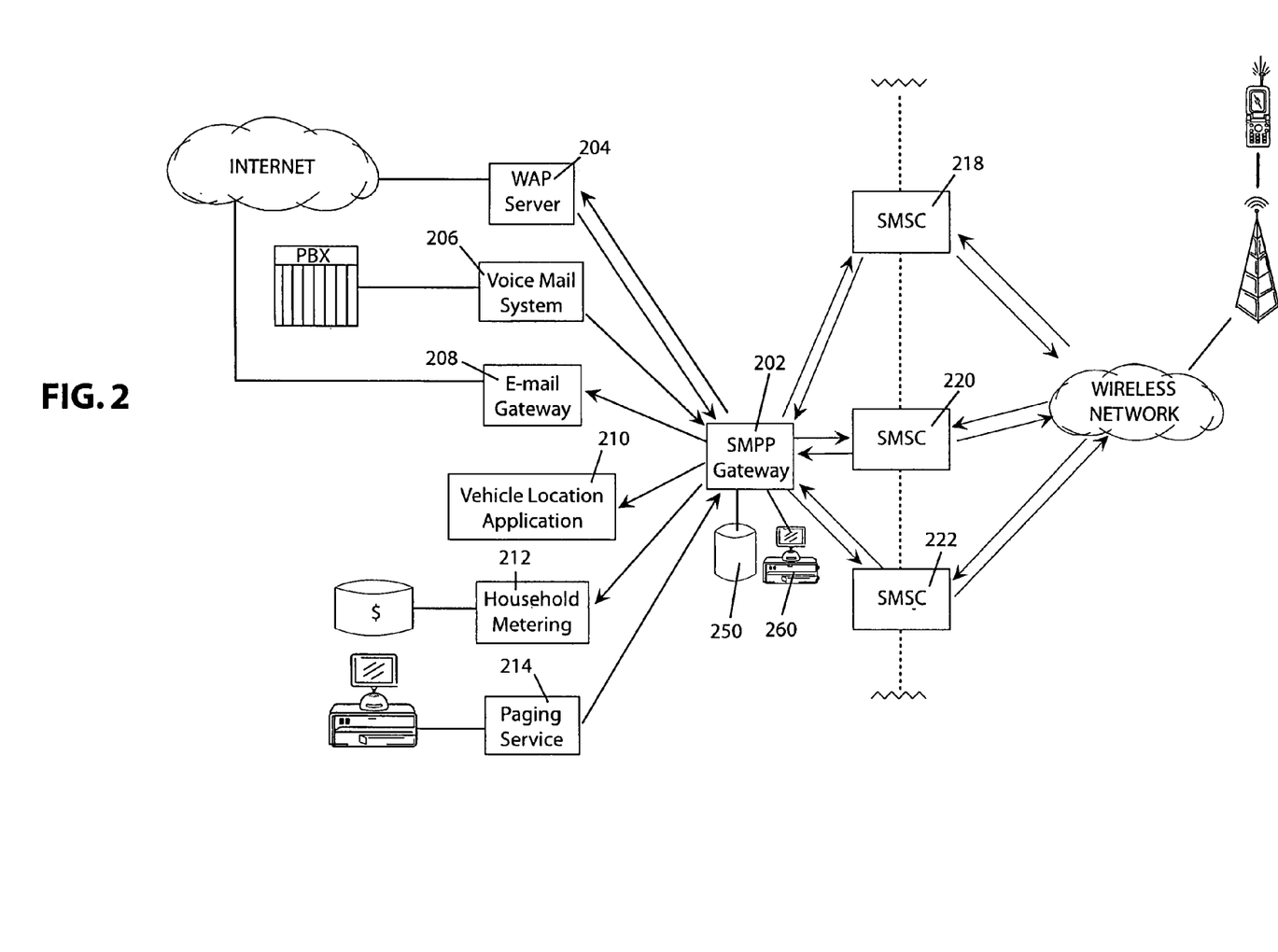
FIG. 2 is a block diagram illustrating a system of interconnected ESMEs and SMSCs in accordance with an embodiment of the present invention.

FIG. 2. illustrates an SMPP enterprise gateway (hereinafter "gateway 202") in accordance with the present invention. In the illustration of FIG. 2, gateway 202 is shown coupled between multiple ESMEs (204, 206, 208, 210, 212 and 214) and multiple SMSCs (218, 220 and 222). Gateway 202 facilitates communications between the ESMEs and SMSCs of FIG. 2 by acting as a single point of access to the SMS network for the various ESMEs. In addition, as will be fully described below, gateway 202 coordinates authentication and authorization of the ESMEs' respective access to the SMS network, provides service link management for the ESMEs and SMSCs, manages routing of SMS messages to the proper devices and handles SMSC message queuing, database storage, usage charge provisioning, establishment of virtual private networks and load balancing for the SMSCs.

Centralizing access and processing of SMS messaging between third party ESMEs and the SMS network promotes efficient use of ESME and SMSC resources. As shown in FIG. 2, connections between the ESMEs and SMSCs are centralized at gateway 202 in a hub configuration.

Gateway 202 is preferably a high powered microprocessor-based server computer capable of processing multiple SMS-related PDUs and related communications simultaneously. As an example, a Compaq ServerNet system platform using Tandem OS may be utilized. Preferably, the server is expandable to accommodate additional ESMEs and SMSCs as required for future expansion.

Additionally, gateway 202 includes multiple ports for physically interfacing connections from the various ESMEs and SMSCs. As an example, the connections may be interfaced directly to gateway 202 using one or more port interface expansion cards. Alternately, the connections may be aggregated at a hub and the data sent to and from gateway 202 via an Ethernet RJ-4510-B or 100-B connection. In either event, gateway 202 is configured to allow it to distinguish the various data streams arriving from the different ESMEs and SMSCs to which it is connected.

The connections from the various ESMEs to gateway 202 may include dedicated 56 kb, ISDN or T-1 lines. Gateway 202 may be physically co-located with any one of SMSCs 218, 220 or 222 or, alternately may be remotely located and connected via T-1 lines or other low or high speed data connection as required.

The various known source code languages, such as C++, and even web based programming constructs, such as Java, can be utilized to implement the specific functionality of gateway 202 as described hereinbelow.

Additional resort may be had to any of the various database software applications offered by Oracle® or IBM® for purposes of maintaining records at gateway 202, including third party ESME access and billing information. Alternately, a separate database server (element 250 of FIG. 2) may be connected to gateway 202 to off-load database functionality from gateway 202. Any one or more persons of skill in the arts of networking and computer programming possessing knowledge of the SMPP protocol can easily program gateway 202 in view of the below description.

Gateway 202 of the present invention acts as a single point of access to the SMS network by receiving, examining, and forwarding the PDU packet communications between the ESMEs and SMSCs. In accordance with the present invention, gateway 202 is programmed to communicate with the ESMEs and SMSCs as an SMPP device in compliance with the SMPP protocol. More particularly, gateway 202 logically appears as an ESME when communicating with an SMSC. Conversely, gateway 202 logically appears as an SMSC when communicating with an ESME. Accordingly, gateway 202 issues any and all PDUs that can be issued by either an ESME and SMSC, e.g., "bind_transmitter", "bind_transmitter_resp", "submit_sm" and "submit_sm_resp" PDUs.

Gateway 202 establishes either a TCP/IP or an X.25 network connections in accordance with the preferred application layer protocol of the ESME with which it is dealing.

Gateway 202 includes a database 250 which stores various information necessary for gateway 202 to carry out its various functions.

Figure 3A:
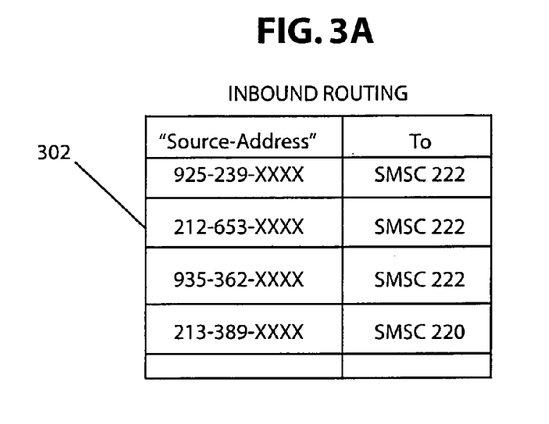
FIGS. 3A–3C illustrate various routing tables utilized in accordance with an embodiment of the present invention.
Figure 3B:
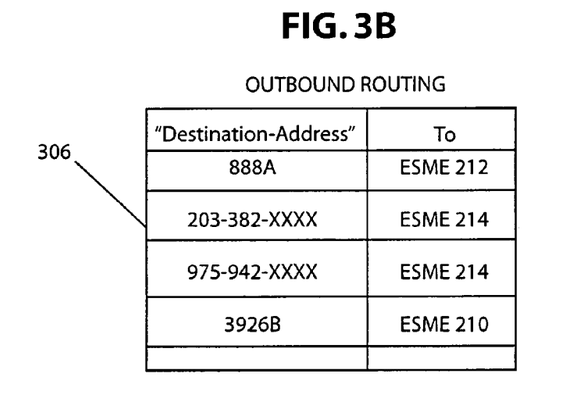
Figure 3C:
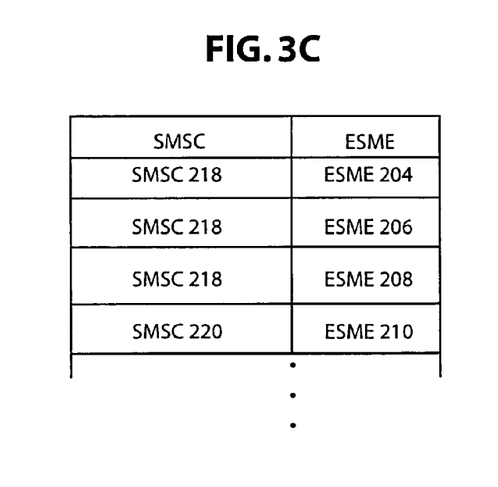

Database 250 includes various tables utilized by gateway 202 to properly route PDUs among the ESMEs and SMSCs, including the routing tables illustrated in FIGS. 3A–3C.

The tables of FIGS. 3A and 3B illustrate, respectively, an inbound and an outbound routing table in accordance with an embodiment of the present invention. When used herein, "inbound" refers to communications sent from an ESME to an SMSC while "outboud" refers to communications sent from an SMSC to an ESME. The tables of FIGS. 3A and 3B are utilized for routing PDUs relating to initiating message submission, delivery and ancillary operations.

The PDUs that initiate such message-related operation, e.g., "submit_sm", "deliver_sm" and "cancel_sm", include a "source_addr" and/or a "destination_addr" parameter that identifies the short messaging entity that originated the message or the short messaging entity to which the message is intended to be delivered. Upon reception of an inbound initiating message-related PDU, gateway 202 utilizes the "source_addr" in conjunction with the routing table illustrated in FIG. 3A to determine the SMSC to which the PDU is to be sent. Upon reception of an outbound initiating message-related PDU, gateway 202 utilizes the "destination_addr" in conjunction with the routing table illustrated in FIG. 3B to determine the ESME to which the PDU is to be sent. Gateway 202 then routes the PDU accordingly.

Additionally, for each initiating message-related PDU it receives, gateway 202 records the "sequence_number" parameter and related information of the message-initiating PDUs so that the information can be later referenced to accomplish routing of non-initiating message-related PDUs.

Message-related PDUs that do not initiate a message-related operation do not include a "source_addr" or "destination_addr" parameter. Such non-initiating message-related PDUs, e.g., "submit_sm_resp", "deliver_sm_resp" and "cancel_sm_resp", echo the message-initiating PDUs, and include a "sequence_number" parameter. In accordance with the SMPP specification, the "sequence_number" parameter of the non-initiating message-related PDU matches the "sequence_number" of the corresponding initiating message-related PDU. Accordingly, when an inbound or outbound non-initiating message-related PDU arrives at gateway 202, the "sequence_number" of the non-initiating message-related PDU is matched against a listing of recorded "sequence_number" parameters of corresponding initiating message-related PDUs that have already passed through gateway 202. In this manner, the proper route of the non-initiating PDU may be traced back to the route of the corresponding initiating message-related PDU. Gateway 202 then routes the non-initiating message-related PDU accordingly.

FIG. 3C, which is also preferably stored at database 250, illustrates a routing table for use with PDUs that are not message-related as described above. More particularly, the routing table of FIG. 3C relate to the session state operations of the SMSCs and ESMEs.

Each of the session state-related PDUs, e.g., the "bind_transmitter" and "outbind", include a "system_id" field which identifies either the SMSC or the ESME associated with the PDU. The table of FIG. 3C associates the "system_id" of the various SMSCs with the "system_id" of the various ESMEs. Gateway 202 utilizes the routing table of FIG. 3C to properly route inbound and outbound session state-related commands between the ESMEs and SMSCs. For those session state-related commands that do not have a "system_id" field, e.g., "unbind" and "enquire_link", gateway 202 may utilize internal port assignments to associate ESMEs to SMSCs and, therefore determine the proper route of the PDUs.

As an alternate embodiment, gateway 202 may manage the session state operations by not passing the binding-related PDUs and, instead, coordinate the binding of the ESMEs and SMSCs in accordance with message traffic, load and other system variables as described below.

In order to distinguish between initiating message-related PDUs, non-initiating message-related PDUs and session state-related PDUs, gateway 202 examines the "command_id" parameter in the header of each incoming PDU to identify the function of the PDU.

The entries in the routing tables of FIGS. 3A–3C will now be more fully explained.

Two columns of the inbound routing table of FIG. 3A are shown. The entries in the first column identify the sender of the message via an ESME attached to Gateway 202. These entries correspond to the "source_addr" parameters of the message-related PDUs. The message sender identification may be in any of the known formats, including national or international mobile or land line number or range of numbers or may be represented in alphanumeric format. As an example, entry 302, which reads "925-234-xxxx", represent a block of 10,000 telephone numbers assigned to paging service 214 of FIG. 2. In accordance with the present embodiment, the administrator of gateway 202 must insure that each "source_addr" is unique to guarantee proper routing.

The entries in the second column of the routing table of FIG. 3A represent the corresponding identification values of the various SMSCs attached to gateway 202. The SMSCs may be identified in any format understood by gateway 202. In the table of FIG. 3A, each SMSC is identified in accordance with the identification of the SMSCs as presented in FIG. 2.

With reference to FIG. 3B, two columns of an inbound routing table are shown. The entries in the first column includes the identification of destinations of messages via any one of the various SMSCs attached to gateway 202. These entries correspond to the "destination_addr" parameters of the message-related PDUs. The message destination identification may be in any of the known formats as described above with reference to the "source_addr" parameters of the inbound routing table. As an example, entry 306, which reads "888A," represents a destination, in alphanumeric format, corresponding to the automated utility meter reading application of ESME 212 of FIG. 2.

The entries in the second column of the routing table of FIG. 3B represent identification values of the various ESMEs attached to gateway 202. The ESMEs may be identified in any format understood by gateway 202. In the exemplary table of FIG. 3B, each SMSC is identified in accordance with the identification presented in FIG. 2.

Thus, for each inbound outbound message-related PDU, gateway 202 references the routing table of FIG. 3B and matches the "destination_addr" of the incoming PDU to a corresponding ESME and forwards the PDU accordingly.

With reference to FIG. 3C, two columns of a routing table for use with both inbound and outbound session state-related PDUs is shown. The entries in the first and second column include, respectively, the identification of SMSCs and ESMEs attached to gateway 202. These entries correspond to the "system_id" parameters of the session state-related PDUs. For each received session state-related PDU, gateway 202 matches the "system_id" of the received PDU to an entry in the routing table of FIG. 3C, finds the device corresponding to the entry and then forwards the PDU to the corresponding device. It is understood that the format of the entries of the routing table of FIG. 3C are merely illustrative. The "system_id" parameter are normally predetermined by the SMS network (for the SMSCs) and by the respective third party vendors (for the ESMEs).

In addition to providing routing functionality, gateway 202 also preferably operates to facilitate greater interaction and flow of operational information between the ESMEs and SMSCs.

Gateway 202 maintains and facilitates the keeping of billing records for charging ESME operators for use of the SMS network. To this end, gateway 202 records usage of the SMS network by the various ESMEs in a variety of ways. For example, gateway 202 may record each instance of a message being sent by an ESME to an SMSC by noting the number of times a "submit_sm" is received at gateway 202 from the ESME. In this manner, the ESME may be charged on a per message basis. Alternately, Gateway 202 may record the amount of time an ESME is bound to a particular SMSC, i.e., the length of time a communications channel is open, by noting the amount of time that elapses between a particular bind command and an unbind command. In this manner, the ESME may be charged on a time-based schedule.

Gateway 202 also preferably provides load balancing functionality. The load balancing functionality of gateway 202 allows a more even distribution of processing PDUs sent from the various ESMEs to the SMS network. Utilizing the load balancing capabilities of gateway 202, a PDU destined for a predetermined SMSC in accordance with the inbound routing table of FIG. 3A may instead be sent to a different SMSC when the predetermined SMSC is not able to accept an incoming PDU. This may occur when, for example, the predetermined PDU does not bind to the ESME because it is not operable or is busy processing other SMS messages. Any of the various server load balancing techniques that are known in the art may be utilized to accomplish the load balancing functionality of gateway 202.

Gateway 202 also preferably includes queuing functionality to complement the load balancing operation of gateway 202. In this manner, gateway 202 may temporarily store a PDU destined for a predetermined SMSC until the SMSC becomes available to receive the PDU, rather than rerouting the PDU to another SMSC. Similarly, gateway 202 may temporarily store PDUs destined for an ESME until the ESME becomes available to receive the PDU. The queuing functionality of gateway 202 may be implemented by segmenting a portion of the RAM memory of gateway 202 as multiple FIFO queues, each respectively associated with the various ESMEs and SMSCs.

Gateway 202 also preferably measures the rate at which messages are sent to gateway 202 from each ESME for delivery to one or more SMSCs for purposes of limiting the amount of gateway resources that are consumed by any one particular ESME at the expense of the other ESMEs attached to gateway 202. As an example, gateway 202 continuously counts the number of "submit_sm" PDUs sent to gateway 202 from a particular ESME and if the rate at which the messages are sent exceeds a predetermined rate, gateway 202 informs the ESME that no additional messages will be accepted for a predetermined amount of time. In this manner, the resources of gateway 202 are more fairly distributed among all of the ESMEs attached to gateway 202.

Gateway 202 also preferably provides enhanced authentication and authorization functionality. SMPP v3.4 presently authenticates and authorizes ESME access to the SMS network via a "password" field included as part of the binding process by an ESME with an SMSC. Gateway 202 augments that functionality by requiring additional security related checks during the entire communication process between an ESME and SMSC. As an example, Gateway 202 may periodically challenge the ESMEs to provide an updated password sent to the ESME via a secure communications channel. Any of the various authentication and authorization techniques for communications known in the art may be utilized by gateway 202 to provide the additional authentication and authorization service to protect the SMS network from unauthorized access and manipulation by third parties.

Gateway 202 also may include provisioning for virtual private networks. Virtual private networks (VPNs), which are known in the art, utilize encryption and tunneling for purposes of establishing secure, end-to-end, private network connections over networks such as the Internet. Preferably, gateway 202 establishes VPNs in the normal manner via TCP/IP for those ESMEs that connect to the SMS network using TCP/IP.

Gateway 202 also preferably includes a web-based interface whereby a system administration terminal 260 provides administrative control of gateway 202 via a web browser. Using system administration terminal 260, a system administrator of gateway 202 controls various aspects of Gateway 202, such as maintenance of the routing tables stored in database 250, and may also retrieve information concerning operation of gateway 202 such as billing and usage records. Administration terminal 260 may be physically co-located with gateway 202 or may be connected to Gateway 202 remotely via a local or wide area telecommunications connection.

Figure 4:
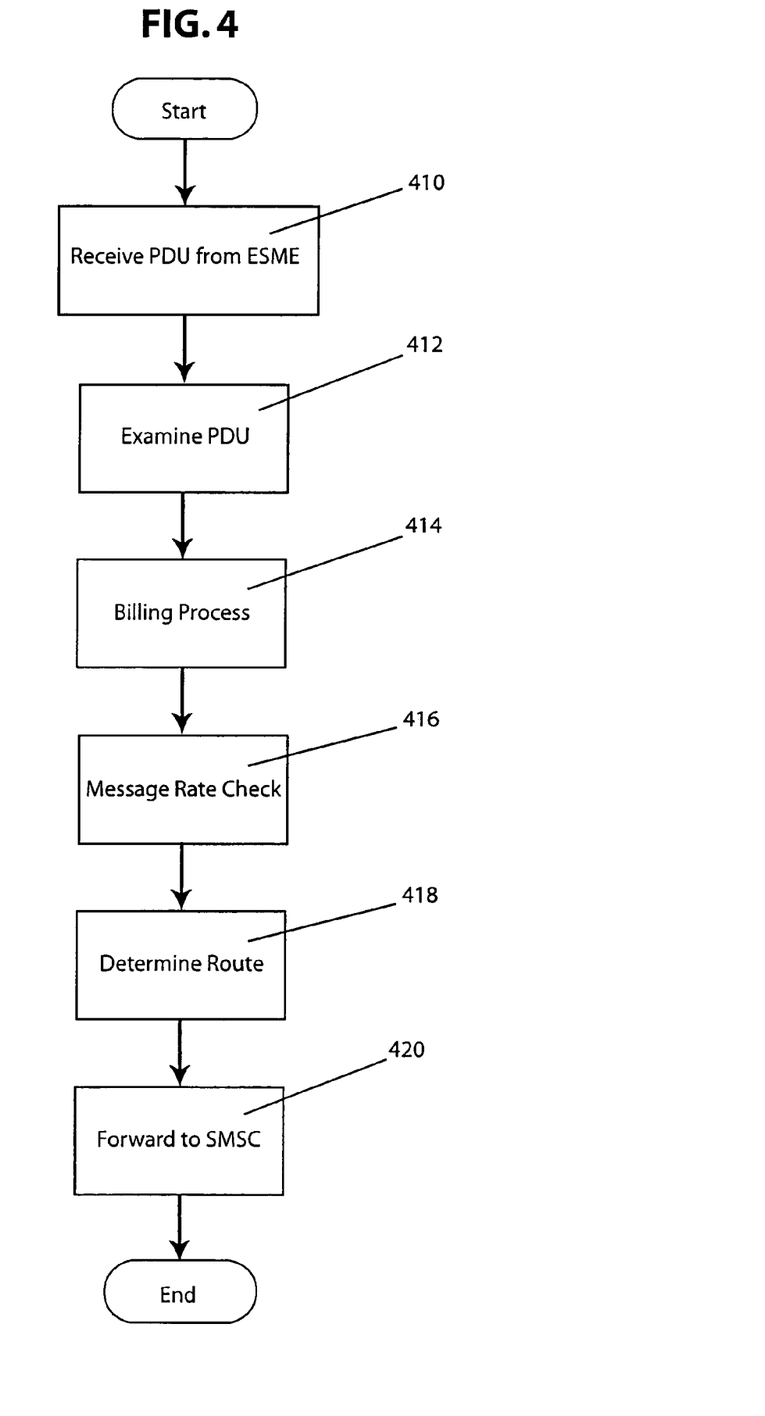
FIG. 4 illustrates, in flow chart format, an embodiment of a method for processing PDUs in an inbound situation in accordance with the present invention.

FIG. 4 represents, in flow chart format, a method by which gateway 202 operates at an inbound port of gateway 202 in accordance with an embodiment of the present invention.

At step 410, gateway 202 receives an inbound PDU from an ESME.

At step 412, gateway 202 examines the PDU received at step 410, and, in particular, examines the "command_id" and any "system_id" or "source_addr" associated with the PDU.

At step 414, gateway 202 executes a billing or usage procedure whereby gateway 202 reviews the "command_id" for purposes of updating a charge file associated with the ESME that sent the present PDU. In accordance with the examples of billing procedures described above, gateway 202 may, at step 414, add to a running tally of sent SMS messages if the "command_id" is an "send_sm" or command (per message based billing), or, alternately, may start a running timer if the "command_id" is an "bind_transmitter" command (time charge based billing).

At step 416, gateway 202 performs a message rate check, whereby if gateway 202 determines that the ESME is attempting to send a message (based, e.g., based on the value of the "command_id") a determination is made as to whether the ESME has exceeded a permitted message rate transmission value. If the value is exceeded, gateway 202 will inform the ESME that the message will not be forwarded to the SMS network. The process of FIG. 4A will then terminate.

If however it is determined at step 416 that the message rate is not exceeded, the process proceeds to step 418 where the route of the PDU is determined in accordance with the above-described routing method, which includes utilization the routing tables of FIGS. 3A–3C.

At step 420, the PDU is forwarded to the appropriate SMSC based on the determined route at step 418.

The process of operation of gateway 202 for outbound PDUs is similar to that for inbound routing of PDUs as illustrated in FIG. 4 except that the PDUs are received from an ESME and routed to an SMSC. Additionally, gateway 202 examines a "destination_addr" filed associated with an outgoing PDU rather than a "source_address" at step 410. Moreover, because outgoing PDUs travel from an SMSC, the billing procedure of step 414 and message rate check procedure of step 416 are not necessary.

Although the above-described embodiment of the present invention utilizes only a single gateway 202, it is understood that multiple gateways may be utilized to provide for multiple site redundancy, fault tolerance and load balancing among the gateways in accordance with known methods in the art. Moreover, multiple and/or redundant ESMEs belonging to same third party provider may be connected to gateway 202 to similarly provide redundancy, fault tolerance and load balancing among the ESMEs.

One skilled in the art will appreciate that additional variations may be made in the above-described embodiment of the present invention without departing from the spirit and scope of the invention which is defined by the claims which follow.

We claim:

1. A mobile messaging gateway for routing mobile messages, comprising:
    a first port for receiving from an External Short Messaging Entity (ESME), a mobile message destined for a Short Message Service Center (SMSC);
    a second port for sending to an ESME, a mobile message sent from an SMSC;
    a third port for receiving from an SMSC, a mobile message destined for an ESME;
    a fourth port for sending to an SMSC, a mobile message sent from an ESME;
    a web-based interface for providing administrative control of the gateway via a web browser; and
    a micro-processor for controlling operation of the mobile messaging gateway, the operation including routing mobile messages from the ESME to the SMSC based on the identity of the ESME and from the SMSC to the ESME based on one of the identity of the destination of the mobile message and the identity of the SMSC.

2. The mobile messaging gateway of claim 1, including:
one or more routing tables, the one or more routing tables having entries identifying the route of mobile messages received by the mobile messaging gateway.

3. The mobile messaging gateway of claim 1, including:
a database, the database being programmed to record mobile message traffic passing through the mobile messaging gateway.

4. The mobile messaging gateway of claim 3, wherein the database is located remote from the mobile messaging gateway.

5. The mobile messaging gateway of claim 1, the mobile messaging gateway being programmed to emulate the operation of an ESME and an SMSC, whereby the first and second ports output data signals commensurate with data signals that are output by an SMSC and the third and fourth ports output data signals that are commensurate with data signals output by an ESME.

6. The mobile messaging gateway of claim 1, the mobile messaging gateway including memory storage for queuing one or more mobile messages destined for one of the ESME and SMSC when the one of the ESME and SMSC is not capable of receiving a mobile message from the mobile messaging gateway.

7. A method for routing a mobile message, the method comprising the steps of:
    receiving the mobile message at a mobile messaging gateway;
    determining, at the mobile messaging gateway, the intended destination of the mobile message, wherein the intended destination of the mobile message is one of an external messaging entity (ESME) and a Short Message Service Center (SMSC); and
    queuing one or more mobile messages destined for one of the ESME and SMSC when the one of the ESME and SMSC is not capable of receiving a moblie message from the mobile messaging gateway.

8. The method of claim 7, wherein the determination of the intended destination of the mobile message is based on the identity of the ESME when the mobile message is received from the ESME and is based on one of the identity of the intended destination of the mobile message and the identity of the SMSC when the mobile message is received from the SMSC.

9. The method of claim 7, wherein the step of determining the intended destination of the mobile message includes the step of referencing one or more routing tables.

10. The method of claim 7, including the step of recording the passage of the mobile message through the mobile messaging gateway.

11. The method of claim 10, including the step of utilizing the record of the passage of the mobile message through the mobile messaging gateway for controlling the rate of passage of mobile message traffic through the mobile messaging gateway.

12. The method of claim 7, including the steps of determining whether the intended destination of the mobile message is presently able to accept the mobile message.

13. The method of claim 12, including the step of queuing the mobile message if a determination is made that the intended destination is not presently able to accept the mobile message.

14. The method of claim 1, including the step of incrementing a charge balance associated with the ESME.

15. A method for controlling the flow of mobile message traffic between a mobile messaging center of a wireless network and a mobile messaging routing device located external to the wireless network, the method comprising the steps of:
    receiving packetized data at a mobile messaging gateway, the packetized data including information to facilitate delivery of a mobile message, the mobile messaging gateway being disposed between the mobile messaging center and the external mobile messaging routing device;
    determining the intended destination of the mobile message based on information contained in the data received at the mobile messaging gateway;
    sending the mobile message to its intended destination;
    recording the utilization of the mobile messaging gateway to send the mobile message to its intended destination;
    determining the ability to send additional mobile messages to the intended destination by referencing the recorded utilization of the mobile messaging gateway.

16. The method of claim 15, including the step of preventing the sending of additional mobile messages to the intended destination upon determination that the intended destination is not presently capable of receiving additional mobile messages.

17. The method of claim 16, including the step of queuing the additional mobile messages until the intended destination is capable of receiving additional mobile messages.

18. The method of claim 15, wherein a wireless device operating on the wireless network originates the mobile message.

19. The method of claim 15, wherein a land-line-based device operating external to the wireless network, originates the mobile message.

20. The method of claim 19, including the step of sending an additional mobile message to a destination that is different from the intended destination upon determination that the intended destination is not presently capable of receiving additional mobile messages.

21. A mobile messaging gateway for routing mobile messages, comprising:
   a first port for receiving from an External Short Messaging Entity (ESME), a mobile message destined for a Short Message Service Center (SMSC);
   a second port for sending to an ESME, a mobile message sent from an SMSC;
   a third port for receiving from an SMSC, a mobile message destined for an ESME;
   a fourth port for sending to an SMSC, a mobile message sent from an ESME;
   provisioning for a virtual private network for providing administrative control of the gateway via a private network connection; and
   a micro-processor for controlling operation of the mobile messaging gateway, the operation including routing mobile messages from the ESME to the SMSC based on the identity of the ESME and from the SMSC to the ESME based on one of the identity of the destination of the mobile message and the identity of the SMSC.

22. The messaging gateway as in claim 21 wherein the private network is one of an intranet or internet.

23. The messaging gateway as in claim 6 wherein the memory storage for queuing one or more mobile messages is RAM memory and a portion of said RAM memory is segmented as multiple FIFO queues, each FIFO queue associated with a different one of the ESME and SMSC.

24. The mobile messaging gateway of claim 21, including:
   one or more routing tables, the one or more routing tables having entries identifying the route of mobile messages received by the mobile messaging gateway.

25. The mobile messaging gateway of claim 21, including:
   a database, the database being programmed to record mobile message traffic passing through the mobile messaging gateway.

26. The mobile messaging gateway of claim 25, wherein the database is located remote from the mobile messaging gateway.

27. The mobile messaging gateway of claim 21, the mobile messaging gateway being programmed to emulate the operation of an ESME and an SMSC, whereby the first and second ports output data signals commensurate with data signals that are output by an SMSC and the third and fourth ports output data signals that are commensurate with data signals output by an ESME.

28. The mobile messaging gateway of claim 21, the mobile messaging gateway including memory storage for queuing one or more mobile messages destined for one of the ESME and SMSC when the one of the ESME and SMSC is not capable of receiving a mobile message from the mobile messaging gateway.

* * * * *

UNITED STATES PATENT AND TRADEMARK OFFICE
CERTIFICATE OF CORRECTION

PATENT NO. : 7,003,307 B1
DATED : February 21, 2006
INVENTOR(S) : Jerry Kupsh et al.

It is certified that error appears in the above-identified patent and that said Letters Patent is hereby corrected as shown below:

<u>Title page,</u>
Item [73], Assignee, delete "Cellco Partnership, Bedminister, NJ (US)" and substitute
-- Cellco Partnership D/B/A/ Verizon Wireless, Bedminister, NJ (US) --.

Signed and Sealed this

Thirtieth Day of May, 2006

JON W. DUDAS
*Director of the United States Patent and Trademark Office*